(12) United States Patent
Green

(10) Patent No.: US 8,590,466 B1
(45) Date of Patent: Nov. 26, 2013

(54) MULTI-PURPOSE SOIL CULTIVATING AND SEEDING APPARATUS

(76) Inventor: David W. Green, Minden, LA (US)

( * ) Notice: Subject to any disclaimer, the term of this patent is extended or adjusted under 35 U.S.C. 154(b) by 355 days.

(21) Appl. No.: 12/931,431

(22) Filed: Feb. 1, 2011

(51) Int. Cl.
*A01B 49/06* (2006.01)

(52) U.S. Cl.
USPC .......................................... 111/130; 111/157

(58) Field of Classification Search
USPC ............. 111/52, 59, 142, 147, 148, 152, 153, 111/156, 157, 177, 189, 191, 194, 130
See application file for complete search history.

(56) References Cited

U.S. PATENT DOCUMENTS 5,666,892 A * 9/1997 Tortella et al. .................. 111/52

\* cited by examiner

*Primary Examiner* — Christopher J Novosad
(74) *Attorney, Agent, or Firm* — R. Keith Harrison

(57) ABSTRACT

A soil cultivating and seeding apparatus includes an apparatus frame, a seed opening formation assembly adapted for attachment to the apparatus frame and a seed dispensing hopper adapted for attachment to the apparatus frame.

17 Claims, 4 Drawing Sheets

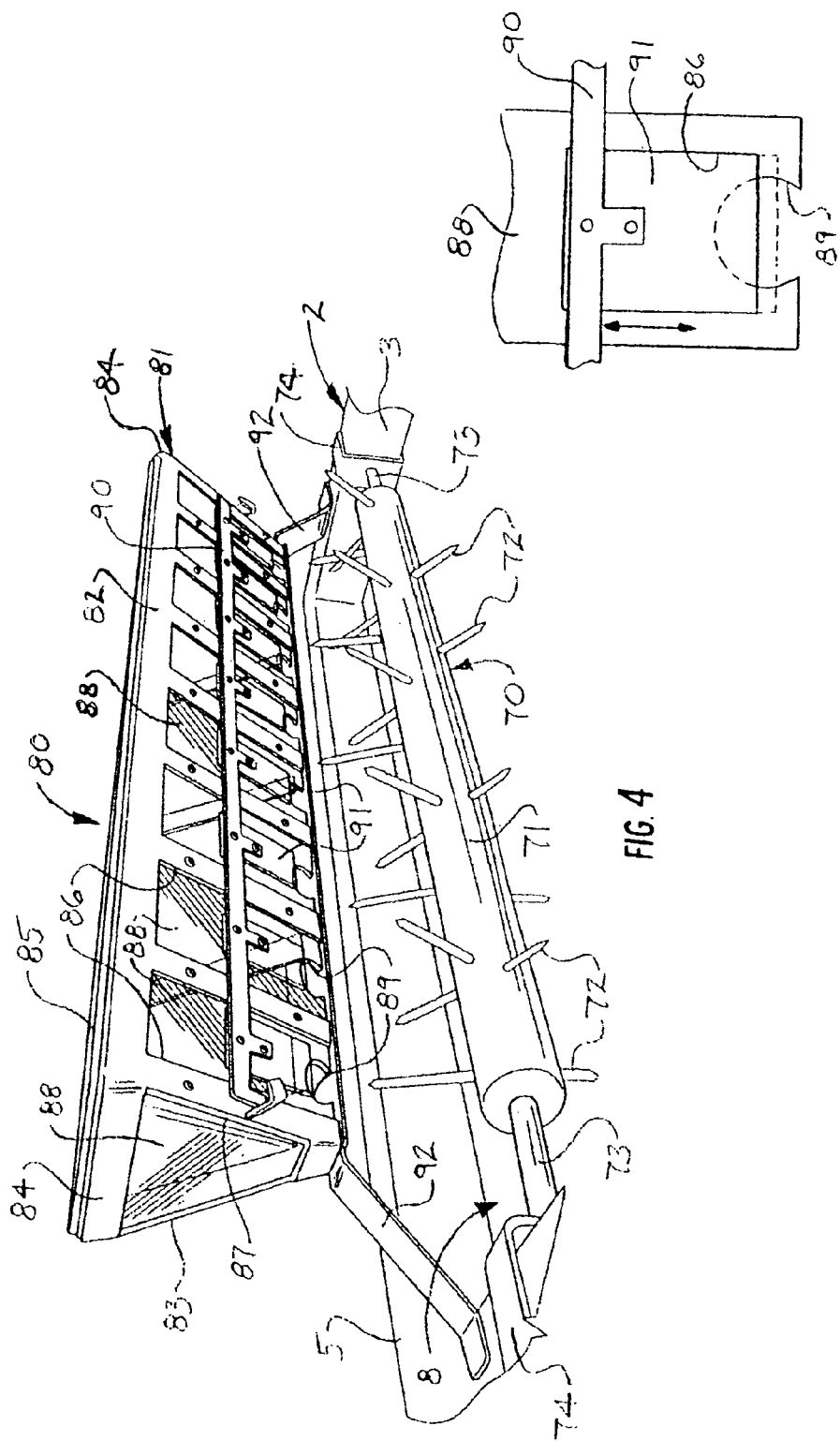

MULTI-PURPOSE SOIL CULTIVATING AND SEEDING APPARATUS

FIELD

The disclosure generally relates to apparatuses for cultivating or preparing soil for growth of vegetation or other purposes. More particularly, the disclosure relates to a multi-purpose soil cultivating and seeding apparatus which can be towed behind a vehicle to aerate, level and/or seed soil for the growing of vegetation and/or other purposes.

BACKGROUND

The growing of crops may require extensive cultivation or preparation of soil and is frequently a multi-step process which may include aerating, leveling and seeding. These steps may be implemented using various types of wheeled trailers or the like which are coupled to a tractor or other towing vehicle and each of which is adapted to implement a particular stage of soil preparation as it is towed behind the vehicle. The trailers may be individually and sequentially coupled to the tractor or other towing vehicle to facilitate cultivation and seeding of the soil. Therefore, conventional soil cultivation and preparation methods and techniques may be laborious and time-consuming.

Accordingly, a multi-purpose soil cultivating and seeding apparatus which can be towed behind a vehicle to aerate, level and/or seed soil for the growing of vegetation and/or for other purposes is needed.

SUMMARY

The disclosure is generally directed to a soil cultivating and seeding apparatus. An illustrative embodiment of the apparatus includes an apparatus frame, a seed opening formation assembly adapted for attachment to the apparatus frame and a seed dispensing hopper adapted for attachment to the apparatus frame.

In some embodiments, the soil cultivating and seeding apparatus may include an apparatus frame having a front frame opening and a rear frame opening; a rake assembly adapted for attachment to the apparatus frame generally between the front frame opening and the rear frame opening; a soil leveling assembly adapted for attachment to the apparatus frame in the rear frame opening; a seed opening formation assembly adapted for attachment to the apparatus frame in the rear frame opening in interchangeable relationship with respect to the soil leveling assembly; and a seed dispensing hopper adapted for attachment to the apparatus frame generally adjacent to the rear frame opening.

In some embodiments, the soil cultivating and seeding apparatus may include an apparatus frame having a pair of spaced-apart, parallel side frame members, a front frame member and a rear frame member extending between the side frame members, a transverse frame member extending between the side frame members between the front frame member and the rear frame member, a front frame opening defined by and between the front frame member and the transverse frame member and a rear frame opening defined by and between the transverse frame member and the rear frame member; a rake assembly adapted for attachment to the apparatus frame generally between the front frame opening and the rear frame opening; a soil leveling assembly adapted for attachment to the apparatus frame in the rear frame opening; a seed opening formation assembly adapted for attachment to the apparatus frame in the rear frame opening in interchangeable relationship with respect to the soil leveling assembly; and a seed dispensing hopper adapted for attachment to the apparatus frame generally adjacent to the rear frame opening and having a hopper frame adapted for attachment to the side frame members, a plurality of front hopper openings provided in the hopper frame, a plurality of hopper windows covering the front hopper openings, respectively, a plurality of seed dispensing openings provided in the hopper windows, respectively, and a plurality of seed block panels slidably carried by the hopper frame and adapted to adjust the sizes of the plurality of seed dispensing openings, respectively.

BRIEF DESCRIPTION OF THE DRAWINGS

The disclosure will now be described, by way of example, with reference to the accompanying drawings, in which:

FIG. 4 is a front perspective view, partially in section, of a seed opening formation assembly mounted in place on the apparatus and a seed dispensing hopper mounted on the apparatus behind the seed opening formation assembly; and FIG. 4A is a front view, partially in section, of a seed dispensing opening in the seed dispensing hopper and a seed block panel mounted on the seed dispensing hopper over the seed dispensing opening and adapted to selectively control the size of the seed dispensing opening.

DETAILED DESCRIPTION

Figure 1:
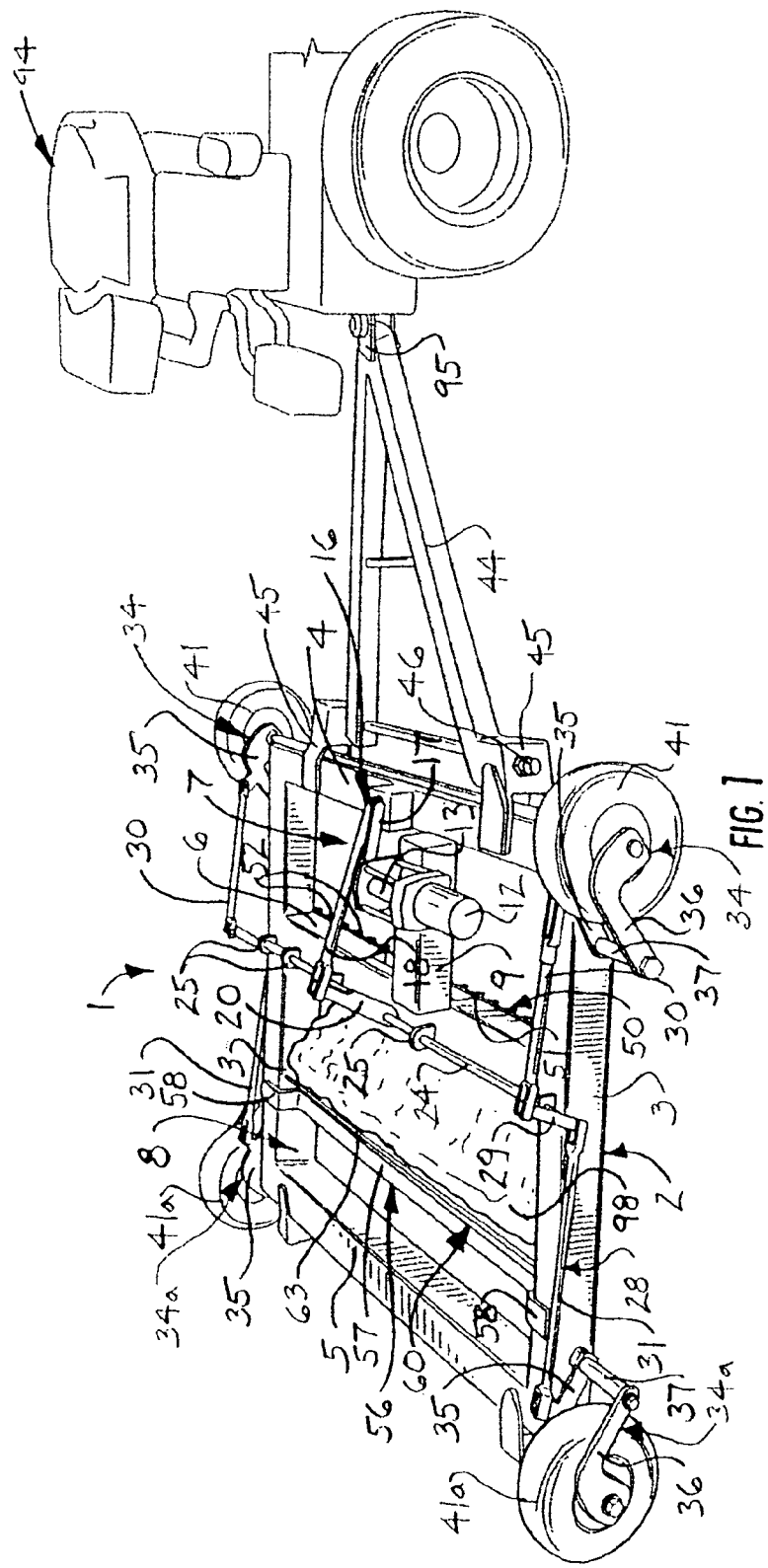
FIG. 1 is a side perspective view of an illustrative embodiment of the multi-purpose soil cultivating and seeding apparatus, coupled to a towing vehicle (partially in section) and deployed in a soil-leveling operation.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. Relative terms such as "front", "rear", "upwardly" and "downwardly" are used for purposes of illustration only and shall not be construed in a limiting sense.

Referring to the drawings, an illustrative embodiment of the multi-purpose soil cultivating and seeding apparatus, hereinafter apparatus, is generally indicated by reference numeral 1. The apparatus 1 may include an apparatus frame 2. In some embodiments, the apparatus frame 2 may have a generally rectangular shape with a pair of generally elongated, parallel, spaced-apart side frame members 3 and a front frame member 4 and a rear frame member 5 extending between the side frame members 3. In other embodiments, the apparatus frame 2 may have alternative shapes or designs.

A transverse frame member 6 may extend between the between the side frame members 3 between and in generally parallel relationship with respect to the front frame member 4 and the rear frame member 5. A front frame opening 7 may be defined by and between the side frame members 3, the front frame member 4 and the transverse frame member 6. A rear frame opening 8 may be defined by and between the side frame members 3, the transverse frame member 6 and the rear frame member 5. A motor mount member 9 may extend forwardly from the transverse frame member 6 into the front frame opening 7 for purposes which will be hereinafter described. Front wheels 41 and rear wheels 41a may be provided on respective wheel axles 40 (FIG. 2) which extend from each side of the apparatus frame 2.

Figure 2:
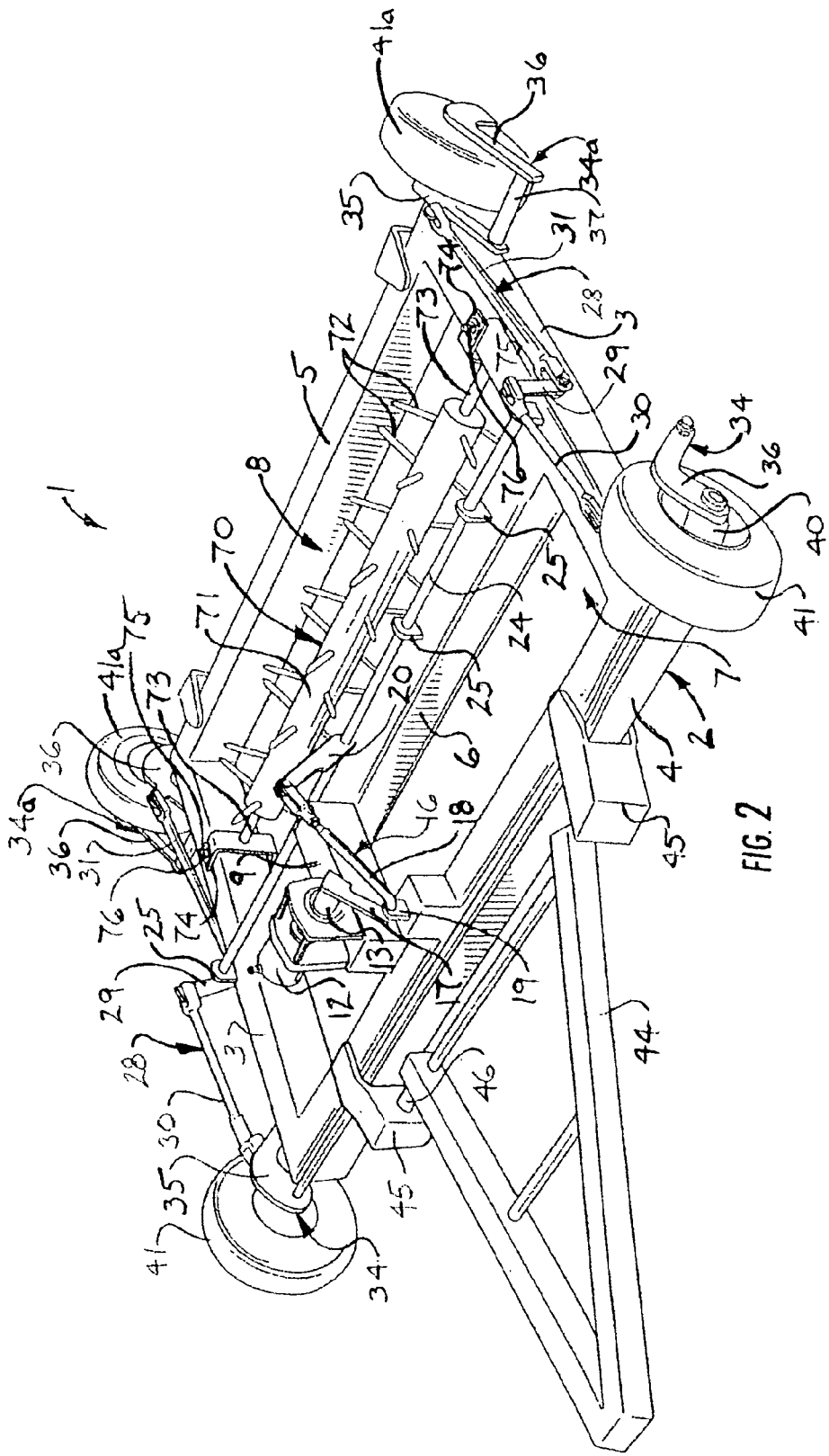
FIG. 2 is a front perspective view of an illustrative embodiment of the multi-purpose soil cultivating and seeding apparatus, with a seed opening formation assembly mounted in place on the apparatus.

A coupling frame 44 may extend forwardly from the front frame member 4 of the apparatus frame 2. As illustrated in FIG. 2, in some embodiments, a pair of spaced-apart coupling frame mounts 45 may be provided on the front frame member 4. A pivot shaft 46 may extend between the coupling frame mounts 45. The coupling frame 44 may extend from the pivot shaft 46 which facilitates pivoting of the coupling frame 44 with respect to the apparatus frame 2 in a vertical plane. The coupling frame 44 may be adapted for coupling to a hitch 95 provided on a towing vehicle 94, as illustrated in FIG. 1.

A frame elevation motor 12 may be provided on the motor mount member 9. In some embodiments, the frame elevation motor 12 may be hydraulically-powered. In other embodiments, the frame elevation motor 12 may be electric. The frame elevation motor 12 may drivingly engage a motor shaft 13. The motor shaft 13 of the frame elevation motor 12 may engage the apparatus frame 2 and the wheel axles 40 of the respective front wheels 41 and rear wheels 41a in such a manner that selective operation of the frame elevation motor 12 raises and lowers the apparatus frame 2 with respect to the front wheels 41 and rear wheels 41a, as will be hereinafter described. Accordingly, the frame elevation motor 12 may engage the apparatus frame 2 and the wheels 41, 41a through a motor linkage 16 which is engaged by the motor shaft 13; a rotatable linkage axle 24 which is engaged by the motor linkage 16; a pair of frame linkages 28 engaged by the linkage axle 24; and a pair of front wheel linkages 34 and a pair of rear wheel linkages 34a engaged by the frame linkages 28. The front wheel linkages 34 may engage the respective side frame members 3 of the apparatus frame 2 and the wheel axles 40 of the respective front wheels 41. The rear wheel linkages 34a may engage the respective side frame members 3 of the apparatus frame 2 and the wheel axles 40 of the respective rear wheels 41a.

The motor linkage 16 may include a proximal linkage arm 17 which is drivingly engaged by the motor shaft 13 of the frame elevation motor 12, a distal linkage arm 18 which is drivingly engaged for rotation by the proximal linkage arm 17 through a linkage flange 19 (FIG. 2) on the apparatus frame 2 and a linkage connecting arm 20 which is pivotally attached to the distal linkage arm 18. The linkage connecting arm 20 of the motor linkage 16 may be attached to the linkage axle 24, which may be rotatably mounted on the transverse frame member 6 of the apparatus frame 2. The linkage axle 24 may extend through multiple axle bearings 25 which are provided at spaced-apart intervals with respect to each other on the transverse frame member 6 and on the respective side frame members 3.

Each frame linkage 28 may include a linkage connecting member 29 which is drivingly engaged for partial rotation by the corresponding end of the linkage axle 24 and a front linkage arm 30 and a rear linkage arm 31 pivotally engaged by the linkage connecting member 29. Each front wheel linkage 34 may include a generally L-shaped inner linkage arm 35, a generally L-shaped outer linkage arm 36 and a connecting arm 37 which connects the inner linkage arm 35 and the outer linkage arm 36. The connecting arm 37 of each front wheel linkage 34 may pivotally engage the corresponding side frame member 3 of the apparatus frame 2. The inner linkage arm 35 of each front wheel linkage 34 may be pivotally attached to the corresponding side frame member 3 of the apparatus frame 2. The front linkage arm 30 of the frame linkage 28 may pivotally engage a first leg of the inner linkage arm 35 of the front wheel linkage 34. The second leg of the inner linkage arm 35 may pivotally engage the connecting arm 37. A first leg of the outer linkage arm 36 may be pivotally engaged by the connecting arm 37. A second leg of the outer linkage arm 36 may pivotally engage the wheel axle 40 (FIG. 2) of each front wheel 41.

Each rear wheel linkage 34a may include a generally L-shaped inner linkage arm 35, a generally L-shaped outer linkage arm 36 and a connecting arm 37 which connects the inner linkage arm 35 and the outer linkage arm 36. The connecting arm 37 of each rear wheel linkage 34a may pivotally engage the corresponding side frame member 3 of the apparatus frame 2. The rear linkage arm 31 of the frame linkage 28 may pivotally engage a first leg of the inner linkage arm 35 of the rear wheel linkage 34a. The second leg of the inner linkage arm 35 may pivotally engage the connecting arm 37. A first leg of the outer linkage arm 36 may be pivotally engaged by the connecting arm 37. A second leg of the outer linkage arm 36 may pivotally engage the wheel axle 40 (FIG. 2) of each rear wheel 41a. Accordingly, by directional operation of the frame elevation motor 12, the motor linkage 16 rotates the linkage axle 24 in the selected clockwise or counterclockwise direction. Rotation of the linkage axle 24 in the clockwise direction in FIG. 1 causes the linkage connecting member 29 of each frame linkage 28 to push the front linkage arm 30 in the forward direction and simultaneously push the rear linkage arm 31 in the rearward direction. This causes the inner linkage arm 35 and the connecting arm 37 of each of the front wheel linkage 34 and the rear wheel linkage 34a to raise the apparatus frame 2 as the outer linkage arm 36 pivots upwardly with respect to the wheel axle 40 (FIG. 2) of each front wheel 41 and rear wheel 41a. Conversely, rotation of the linkage axle 24 in the counterclockwise direction in FIG. 1 causes the linkage connecting member 29 of each frame linkage 28 to pull the front linkage arm 30 in the rearward direction and simultaneously pull the rear linkage arm 31 in the forward direction. This causes the inner linkage arm 35 and the connecting arm 37 of each of the front wheel linkage 34 and the rear wheel linkage 34a to lower the apparatus frame 2 as the outer linkage arm 36 pivots with respect to the wheel axle 40 (FIG. 2) of each front wheel 41 and rear wheel 41a.

Figure 3:
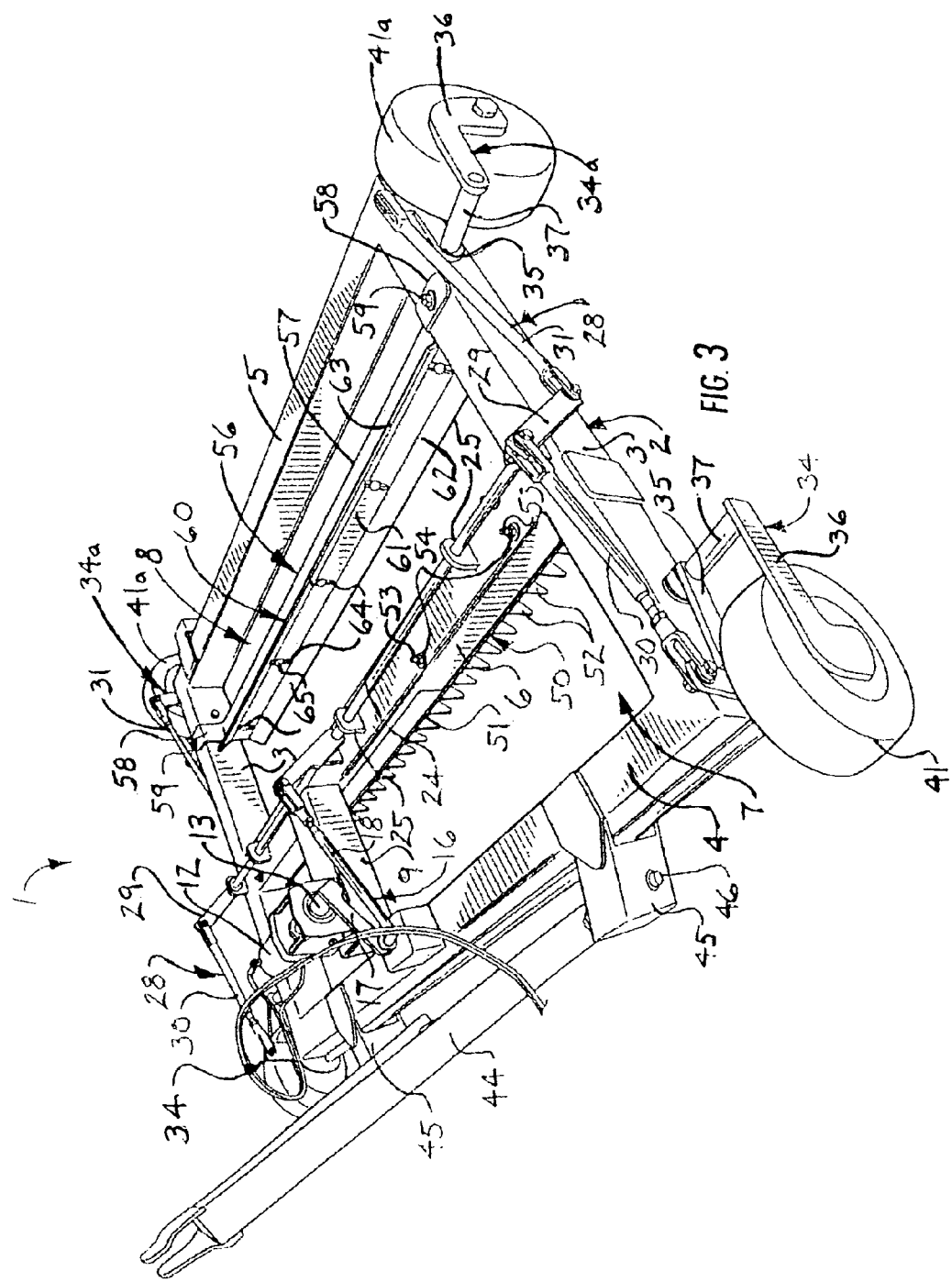
FIG. 3 is a front perspective view of an illustrative embodiment of the multi-purpose soil cultivating and seeding apparatus, with rake assembly and a soil leveling assembly mounted in place on the apparatus.

As illustrated in FIGS. 1 and 3, a rake assembly 50 may be provided on the transverse frame member 6 of the apparatus frame 2. In operation of the apparatus 1, which will be hereinafter described, the rake assembly 50 may be adapted to rake and aerate soil 98 (FIG. 1) as the apparatus 1 is towed behind the towing vehicle 94 (FIG. 1) on top of the soil 98. The rake assembly 50 may have any design which is suitable for the purpose of breaking or disrupting and raking the soil 98 as the apparatus 1 is towed behind the towing vehicle 94. In some embodiments, the rake assembly 50 may include a generally elongated blade mount frame 51 which is attached to the lower surface of the transverse frame member 6 and is transversely oriented with respect to the apparatus frame 2. Multiple, adjacent, spaced-apart rake blades 52 may extend downwardly from the blade mount frame 51. As illustrated in FIG. 3, the blade mount frame 51 may be attached to the transverse frame member 6 in some embodiments by extending bolts 53 through respective bolt openings (not illustrated) provided in the blade mount frame 51 and in the transverse frame member 6 and threading nuts 54 on the respective bolts 53. Alternative attachment techniques known by those skilled in the art may be used to attach the blade mount frame 51 of the rake assembly 50 to the transverse frame member 6. The purpose of the rake assembly 50 will be hereinafter described.

As further illustrated in FIGS. 1-3, a soil leveling assembly 56 may be provided on the apparatus frame 2. In operation of the apparatus 1, which will be hereinafter described, the soil leveling assembly 56 may level the soil 98 after the rake assembly 50 disrupts, aerates and rakes the soil 98. The soil leveling assembly 56 may have any design which is suitable for the purpose of spreading and leveling the soil 98 as the apparatus 1 is towed behind the towing vehicle 94. In some embodiments, the soil leveling assembly 56 may include an elongated assembly mount member 57 which spans the side frame members 3 across the rear frame opening 8 of the apparatus frame 2 in transverse relationship with respect to the travel direction of the apparatus frame 2. A leveling blade 60 may be provided on the assembly mount member 57. The leveling blade 60 may include a center blade portion 61 which is attached to the assembly mount member 57. A lower blade portion 62 and an upper blade portion 63 may angle forwardly from the lower and upper edges, respectively, of the center blade portion 61. The center blade portion 61 may be attached to the assembly mount member 57 according to any suitable technique which is known by those skilled in the art. In some embodiments, blade fasteners 65 may be extended through respective blade slots 64 provided in the center blade portion 61 and into respective registering fastener openings (not illustrated) provided in the assembly mount member 57. In other embodiments, the center blade portion 61 may be welded and/or otherwise attached to the assembly mount member 57.

The assembly mount member 57 of the soil leveling assembly 56 may be attached to the apparatus frame 2 according to any suitable attachment technique which is known by those skilled in the art. In some embodiments, each end of the assembly mount member 57 may be terminated by a pair of spaced-apart mount flanges 58. As illustrated in FIG. 3, the assembly mount member 57 may be detachably attached to the side frame members 3 of the apparatus frame 2 by receiving each the side frame member 3 of the apparatus frame 2 between the corresponding pair of mount flanges 58 on the assembly mount member 57. A mount bolt 59 may be extended through bolt openings (not illustrated) provided in each pair of mount flanges 58 and through a registering bolt opening (not illustrated) provided in the side frame member 3. A securing nut (not illustrated) may be threaded onto each corresponding mount bolt 59. Alternative attachment techniques known by those skilled in the art may be used to attach the assembly mount member 57 of the soil leveling assembly 56 to the side frame members 3. The purpose of the soil leveling assembly 56 will be hereinafter described.

A seed opening formation assembly 70 may be provided on the apparatus frame 2. In operation of the apparatus 1, which will be hereinafter described, the seed opening formation assembly 70 punches openings (not illustrated) in the soil 98 for deposit of seeds (not illustrated) into the openings typically after the leveling blade 60 levels the raked and aerated soil 98. The seed opening formation assembly 70 may have any design which is suitable for the purpose of punching seed openings in the soil 98 as the apparatus 1 is towed behind the towing vehicle 94. In some embodiments, the seed opening formation assembly 70 may include a generally elongated assembly cylinder 71 which spans the side frame members 3 across the rear frame opening 8 in transverse relationship with respect to the travel direction of the apparatus frame 2. Multiple assembly spikes 72 may extend outwardly from the assembly cylinder 71. The assembly cylinder 71 may be rotatably mounted on the apparatus frame 2 according to any suitable technique which is known by those skilled in the art. In some embodiments, assembly mount axles 73 may extend from respective ends of the assembly cylinder 71. A pair of spaced-apart mount flanges 74 may terminate each assembly mount axle 73 and receive the corresponding side frame member 3 of the apparatus frame 2. As illustrated in FIG. 2, a mount bolt 75 may be extended through registering bolt openings (not illustrated) provided in each mount flange 74 and the corresponding side frame member 3. A securing nut 76 may be threaded on each mount bolt 75. Alternative attachment techniques known by those skilled in the art may be used to attach the assembly cylinder 71 of the seed opening formation assembly 70 to the side frame members 3. The purpose of the seed opening formation assembly 70 will be hereinafter described. In some embodiments, the soil leveling assembly 56 and the seed opening formation assembly 70 may be interchangeable with each other on the apparatus frame 2 as will be hereinafter described.

As illustrated in FIG. 4, a seed dispensing hopper 80 may be provided on the apparatus frame 2 generally behind the seed opening formation assembly 70. In operation of the apparatus 1, which will be hereinafter described, the seed dispensing hopper 80 may be adapted to contain and dispense seed (not illustrated) into seed openings (not illustrated) immediately after the seed openings are formed in the soil 98 by the assembly spikes 72 of the rotating seed opening formation assembly 70. The seed dispensing hopper 80 may have any design which is suitable for the purpose of containing and dispensing seeds (not illustrated) into the soil openings in the soil 98 as the apparatus 1 is towed behind the towing vehicle 94. In some embodiments, the seed dispensing hopper 80 may include a generally elongated hopper frame 81 which may be transversely mounted on the apparatus frame 2. In some embodiments, the hopper frame 81 may include a front frame surface 82, a rear frame surface 83 and side frame surfaces 84 which extend between the front frame surface 82 and the rear frame surface 83. The hopper frame 81 may have an elongated top hopper opening 85. Multiple, adjacent front hopper openings 86 may be provided in the front frame surface 82 of the hopper frame 81. A side hopper opening 87 may be provided in each side frame surface 84 of the hopper frame 81. A transparent hopper window 88 may cover each of the front hopper openings 86 and the side hopper openings 87.

As illustrated in FIG. 4A, a seed dispensing opening 89 may be provided in each hopper window 88 which covers the front hopper openings 86. In some embodiments, the seed dispensing opening 89 may be provided in a lower edge of each hopper window 88. A seed block panel 91 may be provided on the hopper frame 81 and adapted to cover or block a selected portion of and vary the size of each seed dispensing opening 89 by sliding of the seed block panel 91 up or down with respect to the hopper window 88. Each seed block panel 91 may be mounted on the hopper frame 81 according to any suitable technique which is known by those skilled in the art. In some embodiments, an elongated panel arm 90 may be mounted on the hopper frame 81 in transverse relationship with respect to the hopper windows 88 in the respective front hopper openings 86. As illustrated in FIG. 4A, each seed block panel 91 may be slidably mounted on the panel arm 90 in such a manner that the seed block panel 91 can be positioned to expose the entire seed dispensing opening 89 or block a selected portion of the seed dispensing opening 89 and therefore, vary the quantity of seed which is dispensed from the seed dispensing hopper 80 through the seed dispensing openings 89 as the apparatus 1 is towed behind the towing vehicle 94.

The hopper frame 81 of the seed dispensing hopper 80 may be attached to the side frame members 3 of the apparatus frame 2 according to any suitable technique known by those skilled in the art. As illustrated in FIG. 4, in some embodiments a pair of hopper mount arms 92 may extend from opposite ends of the hopper frame 81. A bolt (not illustrated) may be extended through registering bolt openings (not illustrated) provided in each hopper mount arm 92 and the corresponding underlying side frame member 3. A securing nut (not illustrated) may be threaded on the bolt. In some embodiments, the hopper mount arms 92 may be welded and/or otherwise attached to the respective side frame members 3.

In exemplary application, the apparatus 1 is coupled to the hitch 95 (FIG. 1) on the towing vehicle 94 and towed over soil 98 on the front wheels 41 and the rear wheels 41*a* to cultivate or aerate, level and/or seed the soil 98 for the growing of vegetation and/or other purposes. Accordingly, initially the rake assembly 50 is mounted on the transverse frame member 6 and the soil leveling assembly 56 is mounted in the rear frame opening 8 of the apparatus frame 2 such as in the manner which was heretofore described with respect to FIGS. 1 and 3. In the event that it is necessary to first tow the apparatus 1 from a storage area or the like to the area in which the soil 98 is to be cultivated, the frame elevation motor 12 may be operated to raise the apparatus frame 2 via actuation of the motor linkage 16, the linkage axle 24, the frame linkages 28, the front wheel linkages 34 and the rear wheel linkages 34*a* in order to clear the rake assembly 50 and the leveling blade 60 off the ground. When the apparatus 1 arrives at the location of the soil 98 which is to be cultivated, the frame elevation motor 12 may be operated to lower the apparatus frame 2 via actuation of the motor linkage 16, the linkage axle 24, the frame linkages 28, the front wheel linkages 34 and the rear wheel linkages 34*a* in order to lower the rake assembly 50 and the leveling blade 60 into contact with the soil 98. As the towing vehicle 94 tows the apparatus 1 over the soil 98, the rake blades 52 of the rake assembly 50 break or disrupt, aerate and rake the soil 98. The leveling blade 60 of the soil leveling assembly 56 follows behind the rake assembly 50 and spreads and levels the disrupted soil 98.

After the soil 98 is disrupted and leveled using the rake assembly 50 and the soil leveling assembly 60 typically as was heretofore described, the towing vehicle 94 is stopped and the rake assembly 50 may be removed from the transverse frame member 6 of the apparatus frame 2. The soil leveling assembly 56 may be removed from the side frame members 3 of the apparatus frame 2. The seed opening formation assembly 70 may be attached to the side frame members 3 of the apparatus frame 2 in place of the soil leveling assembly 56 typically as was heretofore described with respect to FIG. 2. The seed dispending hopper 80 may be attached to the side frame members 3 of the apparatus frame 2 typically as was heretofore described with respect to FIG. 4. A supply of seed (not illustrated) may be placed in the seed dispensing hopper 80 typically through the top hopper opening 85. The seed block panels 91 on the seed dispensing hopper 80 may be adjusted up or down on the panel arm 90 to impart a selected size to each seed dispensing opening 89 depending on the desired quantity of seed which is to be dispensed from the seed dispensing hopper 80 through the seed dispensing openings 89.

As the towing vehicle 94 tows the apparatus 1 on the disrupted and aerated soil 98, the assembly cylinder 71 of the seed opening formation assembly 70 rotates as the assembly spikes 72 punch seed openings (not illustrated) in the soil 98. The pattern of seed openings in the soil 98 is defined by the spacing and arrangement of the assembly spikes 72 on the assembly cylinder 71. Seeds (not illustrated) fall from the seed dispensing hopper 80 through the respective seed dispensing openings 89 and into the seed openings (not illustrated) which were punched into the soil 98 by the assembly spikes 72 of the seed opening formation assembly 70. In some applications, the seed opening formation assembly 70 may next be removed from the apparatus frame 2 and the soil leveling assembly 56 again attached to the apparatus frame 2. The towing vehicle 94 may be operated to tow the apparatus 1 over the soil 98 such that the leveling blade 60 of the soil leveling assembly 56 fills the seed openings and covers the seeds therein with soil 98. The seeds ultimately germinate in the soil 98 and form crops.

While the preferred embodiments of the disclosure have been described above, it will be recognized and understood that various modifications can be made in the disclosure and the appended claims are intended to cover all such modifications which may fall within the spirit and scope of the embodiments of the disclosure.

What is claimed is:

1. A soil cultivating and seeding apparatus, comprising:
   a plurality of wheels;
   an apparatus frame carried by said plurality of wheels;
   a frame elevation motor carried by said apparatus frame and operably engaging said apparatus frame and said plurality of wheels to raise and lower said apparatus frame with respect to said plurality of wheels;
   a motor linkage drivingly engaged by said frame elevation motor;
   a linkage axle carried by said apparatus frame and engaged by said motor linkage;
   a pair of frame linkages engaged by said linkage axle;
   a plurality of wheel linkages engaged by said pair of frame linkages and engaging said plurality of wheels;
   a seed opening formation assembly adapted for attachment to said apparatus frame; and
   a seed dispensing hopper adapted for attachment to said apparatus frame.

2. The apparatus of claim 1 further comprising a rake assembly adapted for attachment to said apparatus frame.

3. The apparatus of claim 1 further comprising a soil leveling assembly adapted for attachment to said apparatus frame.

4. The apparatus of claim 3 wherein said soil leveling assembly is adapted for attachment to said apparatus frame in interchangeable relationship with respect to said seed opening formation assembly.

5. The apparatus of claim 1 further comprising a coupling frame carried by said apparatus frame.

6. A soil cultivating and seeding apparatus, comprising:
   a plurality of wheels;
   an apparatus frame carried by said plurality of wheels, said apparatus frame having a front frame opening and a rear frame opening;
   a frame elevation motor carried by said apparatus frame and operably engaging said apparatus frame and said plurality of wheels to raise and lower said apparatus frame with respect to said plurality of wheels;
   a motor linkage drivingly engaged by said frame elevation motor;

a linkage axle carried by said apparatus frame and engaged by said motor linkage;
a pair of frame linkages engaged by said linkage axle;
a plurality of wheel linkages engaged by said pair of frame linkages and engaging said plurality of wheels;
a rake assembly adapted for attachment to said apparatus frame generally between said front frame opening and said rear frame opening;
a soil leveling assembly adapted for attachment to said apparatus frame in said rear frame opening;
a seed opening formation assembly adapted for attachment to said apparatus frame in said rear frame opening in interchangeable relationship with respect to said soil leveling assembly; and
a seed dispensing hopper adapted for attachment to said apparatus flame generally adjacent to said rear frame opening.

7. The apparatus of claim 6 wherein said apparatus frame comprises a pair of spaced-apart, parallel side frame members; a front frame member and a rear frame member extending between said side frame members; and a transverse frame member extending between said side frame members between said front frame member and said rear frame member, and wherein said front frame opening is defined by and between said front frame member and said transverse frame member and said rear frame opening is defined by and between said transverse frame member and said rear frame member.

8. The apparatus of claim 7 wherein said rake assembly comprises a blade mount frame adapted for attachment to said transverse frame member and a plurality of spaced-apart rake blades carried by said blade mount frame.

9. The apparatus of claim 7 wherein said soil leveling assembly comprises an assembly mount member carried by said side frame members and a leveling blade carried by said assembly mount member.

10. The apparatus of claim 9 further comprising a pair of spaced-apart mount flanges carried by each end of said assembly mount member and receiving said side frame members, respectively.

11. The apparatus of claim 7 wherein said seed opening formation assembly comprises a generally elongated assembly cylinder rotatably carried by said side frame members and a plurality of assembly spikes extending from said assembly cylinder.

12. The apparatus of claim 11 further comprising a pair of assembly mount axles extending from said assembly cylinder and engaging said side frame members, respectively.

13. The apparatus of claim 7 wherein said seed dispensing hopper comprises a hopper frame adapted for attachment to said side frame members; a plurality of front hopper openings provided in said hopper frame; a plurality of hopper windows covering said front hopper openings, respectively; and a plurality of seed dispensing openings provided in said hopper windows, respectively.

14. A soil cultivating and seeding apparatus, comprising:
a plurality of wheels;
an apparatus frame carried by said plurality of wheels, said apparatus frame having a pair of spaced-apart, parallel side frame members, a front frame member and a rear frame member extending between said side frame members, a transverse frame member extending between said side frame members between said front frame member and said rear frame member, a front frame opening defined by and between said front frame member and said transverse frame member and a rear frame opening defined by and between said transverse frame member and said rear frame member;
a frame elevation motor carried by said apparatus frame and operably engaging said apparatus frame and said plurality of wheels to raise and lower said apparatus frame with respect to said plurality of wheels;
a motor linkage drivingly engaged by said frame elevation motor;
a linkage axle carried by said apparatus frame and engaged by said motor linkage;
a pair of frame linkages engaged by said linkage axle;
a plurality of wheel linkages engaged by said pair of frame linkages and engaging said plurality of wheels;
a rake assembly adapted for attachment to said apparatus frame generally between said front frame opening and said rear frame opening;
a soil leveling assembly adapted for attachment to said apparatus frame in said rear frame opening;
a seed opening formation assembly adapted for attachment to said apparatus frame in said rear frame opening in interchangeable relationship with respect to said soil leveling assembly; and
a seed dispensing hopper adapted for attachment to said apparatus frame generally adjacent to said rear frame opening and having a hopper frame adapted for attachment to said side frame members, a plurality of front hopper openings provided in said hopper frame, a plurality of hopper windows covering said front hopper openings, respectively, a plurality of seed dispensing openings provided in said hopper windows, respectively, and a plurality of seed block panels slidably carried by said hopper frame and adapted to adjust the sizes of said plurality of seed dispensing openings, respectively.

15. The apparatus of claim 14 wherein said rake assembly comprises a blade mount frame adapted for attachment to said transverse frame member and a plurality of spaced-apart rake blades carried by said blade mount frame.

16. The apparatus of claim 14 wherein said soil leveling assembly comprises an assembly mount member carried by said side frame members and a leveling blade carried by said assembly mount member, and further comprising a pair of spaced-apart mount flanges carried by each end of said assembly mount member and receiving said side frame members, respectively.

17. The apparatus of claim 14 wherein said seed opening formation assembly comprises a generally elongated assembly cylinder rotatably carried by said side frame members and a plurality of assembly spikes extending from said assembly cylinder, and further comprising a pair of assembly mount axles extending from said assembly cylinder and engaging said side frame members, respectively.

* * * * *